United States Patent Office 3,309,564
Patented Mar. 14, 1967

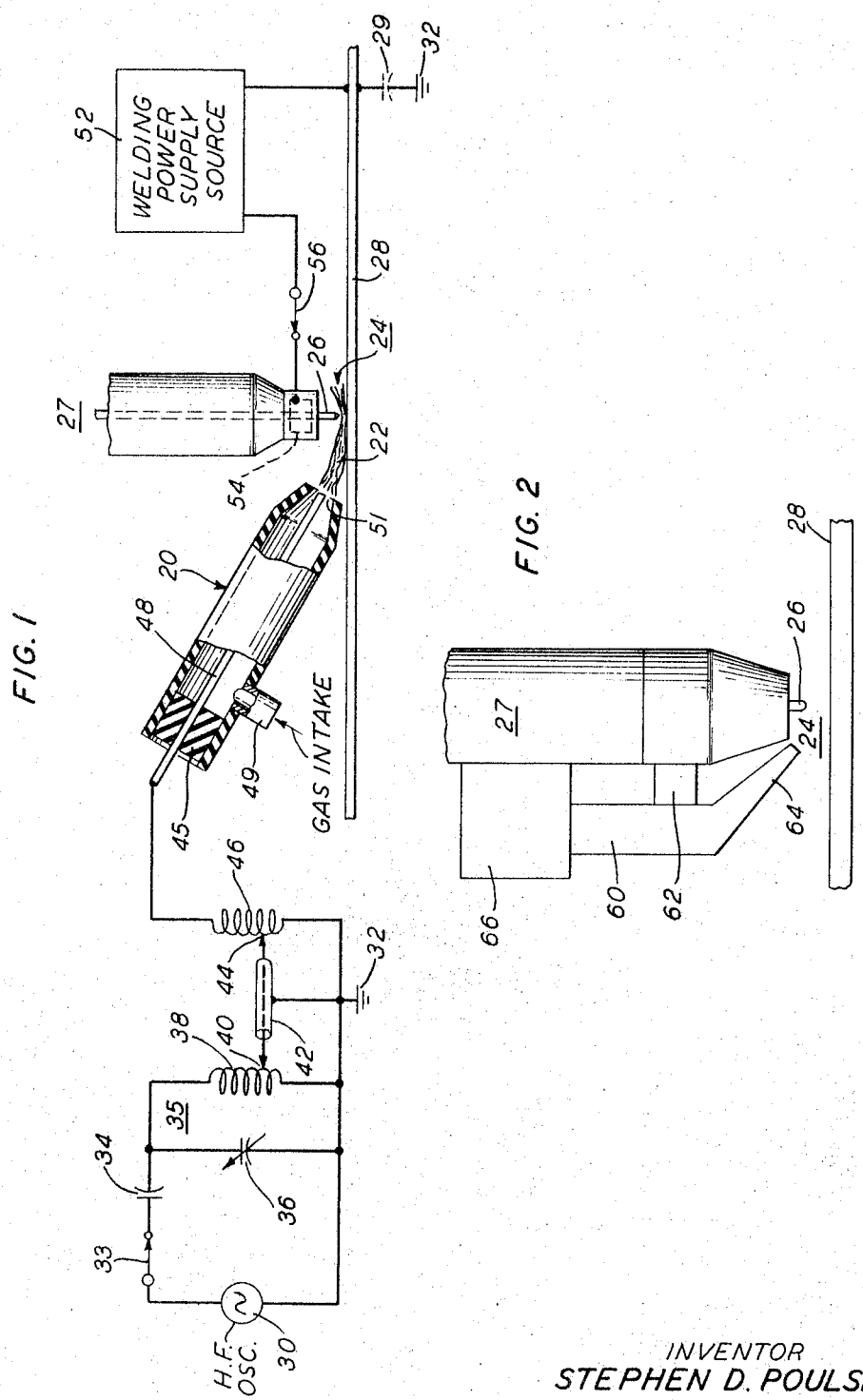

3,309,564
ARC WELDING APPARATUS HAVING PLASMA
GENERATOR FOR STARTING
Stephen D. Poulsen, Summit, N.J., assignor to Air Reduction Company, Incorporated, New York, N.Y., a corporation of New York
Filed Dec. 26, 1963, Ser. No. 333,534
2 Claims. (Cl. 315—111)

This invention relates to electric arc starting and more particularly to starting arrangements employing auxiliary high voltage energy to facilitate the starting of the arc.

An object of the invention is to insure continuously reliable starting of an electric power arc.

Another object is to restrict the volume of space within which objectionable high frequency radiations exist where high frequency discharges are used to facilitate arc starting.

A related object is to prevent high frequency power from being transmitted along or radiated from a welding cable leading from a welding machine to the electrode holder, or from an extended welding electrode such as a wire fed to an electrode holder from a supply reel.

It is a feature of the invention that the high frequency field employed to facilitate the starting of the arc is introduced in the form of a flame or body of plasma which is developed without any electrical connection to the welding circuit. This feature avoids the use of either a coupling transformer or a coupling capacitor for introducing high frequency currents into the welding circuit, thereby avoiding loss of voltage at the arc due to voltage drop in a transformer winding, or the necessity of inserting a choke coil in the welding circuit to prevent short-circuiting of the high frequency generator by a low impedance welding power supply circuit in shunt with the above mentioned coupling capacitor.

Another feature is the absence of any customary electrical or magnetic connection between the plasma torch and the welding circuit. This feature avoids the setting up of high frequency waves, either traveling or standing, upon a welding cable leading from the welding machine to the electrode holder. The feature also avoids radiation of high frequency energy where either the welding cable or a wire electrode feed system acts as a transmitting antenna. This radiation is particularly severe where the electrode wire runs a considerable distance from the wire storage reel to the electrode holder, or where the welding cable is relatively long. Such radiation not only requires increased output of power from the high frequency generator but also constitutes serious interference with radio communication.

Other objects, features and advantages will appear from the following more detailed description of illustrative embodiments of the invention, which will now be given in conjunction with the accompanying drawing.

In the drawing:

FIGURE 1 is a combined electrical and mechanical schematic diagram of an illustrative embodiment of the invention; and FIGURE 2 is a fragmentary detailed view of a portion of a modified embodiment of the invention.

Referring to FIGURE 1, 20 is a plasma torch mounted in position to project a plasma flame 22 into the arc gap region 24 between an arc electrode 26 in a welding head 27, and a workpiece 28 so that the flame 22 envelopes the arc gap, thereby providing an ionized conductive path between the arc electrodes comprising the electrode 26 and the workpiece 28 respectively.

The plasma torch 20 is energized by means of a high frequency oscillator 30 which is connected through an oscillator control switch 33 and a coupling capacitor 34 to a resonant circuit 35 tunable substantially to the frequency of the oscillator and comprising an adjustable capacitor 36 and a voltage step-down autotransformer winding 38. An adjustable tap contactor 40 movable along the winding 38 is connected through the inner conductor of a coaxial transmission line 42 to an adjustable tap connector 44 movable along the winding 46 of a voltage step-up autotransformer. The outer conductor of the line 42 and the lower terminal of each of the circuit elements 30, 36, 38 and 46 may be connected to a common ground as indicated at 32 in FIGURE 1. The ungrounded terminal of the winding 46 is connected to the electrode 48 of the plasma torch 20, which electrode is mounted in a spacer 45. In use, the torch electrode 48 will have an alternating current, high frequency path through stray capacitances to nearby metallic objects, such as the workpiece 28 and thence through stray capacitance, represented schematically at 29 in FIGURE 1, from the workpiece 28 to the ground 32.

Closing of the switch 33 causes high frequency energy to be applied through the coupling capacitor 34 to the resonant circuit 35. Power is taken off at relatively low voltage at the tap 40 and transmitted over the line 42 still at low voltage. Transmission of this power may be extended over moderate distances without excessive loss, so that, if desired, the oscillator 30 may be located at some distance from the welding head 27. The high frequency power is stepped up to a high voltage capable of producing a suitable plasma flame, by means of the winding 46. Air or other gas is drawn into the torch through a gas intake 49 and forced out through a nozzle 51 to form the plasma flame 22.

A welding power supply source 52 has one terminal connected to the electrode 26 through an electrode holder 54 and a welding circuit control switch 56, and the other terminal connected to the workpiece 28. The source 52 may be of any desired type, for example, a direct current source of either straight polarity or reversed polarity, or an alternating current source.

In the operation of the arrangement of FIG. 1, assuming first that both switches 33 and 56 are open, when it is desired to start the arc between the electrode 26 and the workpiece 28, the switch 56 may first be closed, thereby impressing the full voltage of the welding power supply source 52 across the arc gap. The switch 33 may then be closed, thereby connecting the high frequency oscillator 30 to the plasma torch 20 and establishing the plasma flame 22 enveloping the arc gap region 24 and forming an ionized conductive path between the electrode 26 and the workpiece 28. Thereupon a power arc is immediately established through the arc gap and is sustained in stable state by the power supplied by the source 52. If desired, the plasma torch may now be de-energized by opening the switch 33. There need be no physical connection between the plasma torch 20 and the welding head 27, so that when the arc has been established and the welding head is to be used in a welding operation, the head may be moved about as required in relation to the workpiece, keeping the electrode tip in suitable proximity to the workpiece to avoid extinguishing the arc. During the welding operation, the plasma torch may be left behind until needed again, at which latter time the welding head may be returned to the vicinity of the plasma torch, or vice versa.

FIG. 2 shows an alternate arrangement wherein a plasma torch 60 is permanently attached to the welding head 27 as by means of a bracket 62. The torch is shown as being shaped to bring the nozzle 64 into close proximity to the arc gap region 24. The high frequency oscillator 30 and intermediate circuit components for supplying power to the plasma torch are not excessively heavy or bulky and for that reason may be mounted upon the welding head 27 as in a shielded box 66. Due to the short distances involved, the transmission line 42 may be replaced by a direct connection between the tap connectors 40 and 44, or the windings 38 and 46 and the coupling therebetween as shown in FIG. 1 may be replaced by a voltage step-up transformer in known manner. In the use of the arrangement of FIG. 2, if desired, the oscillator 30 may be kept in operation continuously, so that the welding power may be disconnected and reconnected as required by the work at hand and the arc will be immediatley restarted every time the welding power is reconnected, due to the presence of the plasma flame in the arc region.

The arrangements of the invention may be used whether or not non-conductive shielding gas is supplied to the arc region by the welding head. When the plasma torch is turned on, it supplies conductive gas which emerges from the torch at sufficient velocity to permeate or to sweep away the mass of non-conductive shielding gas, enabling the welding power source to start arc current flowing. Thereupon the arc supplies its own conductive gas to keep the arc going, so that the plasma torch may be turned off when the arc has started.

In practice, the supply of shielding gas, if used, may be turned on at the same time as the welding power source is connected to the arc electrodes and a supply of gas to the plasma torch may be turned on at the same time as high frequency power is connected to the torch.

Various forms of plasma torch may be substituted for the form illustrated herein according to the requirements of the particular welding equipment with which it is to be used. The gas supplied to the plasma torch may be the same kind of gas as is used for shielding the arc, or the gas supplied to the plasma torch may be a different one having properties especially desirable for arc starting.

Reference may be made to U.S. Patent 2,587,331, issued Feb. 26, 1952 to J. P. Jordan, for other forms of plasma torch suitable for use in connection with the present invention and for a discussion of the general mechanism of plasma formation.

In an embodiment of the invention that was successfully operated for starting a power welding arc, argon was used as the gas supplied to the torch to support the flame. Sufficient gas pressure was employed to ensure a flow of from 10 to 15 cubic feet of the gas per hour to the flame. Other non-corrosive gases may also be used, for example helium, nitrogen, etc. The high frequency oscillator used was a 4.5 megacycle tuned-plate, tuned-grid vacuum tube continuous wave oscillator of rated 1000 watt power capacity, operated at about 360 watts. It was found that enough voltage was impressed upon the torch electrodes by this oscillator so that when the gas was turned onto the torch the flame started substantially instantaneously without any auxiliary starting means or equipment. The required voltage was estimated as being in the neighborhood of 2000 volts.

The welding circuit was operated at about 15 amperes welding current, using argon as shielding gas and a welding electrode of 2 percent thoriated tungsten.

In 260 successive trials of the arc starting arrangement according to the invention, 260 successful arc startings were achieved, in each case the arc starting within about 1/30 of a second.

While illustrative forms of apparatus and methods in accordance with the invention have been described and shown herein, it will be understood that numerous changes may be made without departing from the general principles and scope of the invention.

I claim as my invention:

1. In an electric arc welding apparatus having two electrodes spaced apart to form an arc gap, in combination, a high frequency source, a shielded high frequency transmission line, voltage step-down means connecting said source to one end of said line, a plasma torch electrically separate from the remainder of the electric arc apparatus, voltage step-up means connecting the other end of said line to said torch, and means to project a plasma flame from said torch to the region of the arc gap to provide an ionized path across said arc gap to facilitate establishment of an arc thereacross.

2. In an electric arc welding starting apparatus, in combination, a high frequency electric oscillator, a tuned output circuit connected to the output of said oscillator, a coaxial transmission line, voltage step-down means connecting said tuned circuit to the input terminals of said transmission line, a plasma torch electrically separate from the remainder of the electric arc apparatus, voltage step-up means connecting the output terminals of said transmission line to the input terminals of said plasma torch, a pair of welding electrodes, defining an arc gap, means to impress welding power upon said arc gap, means to position said plasma torch to project a plasma flame into the region of said arc gap, and means to supply gas to said torch to sustain said plasma flame.

References Cited by the Examiner

UNITED STATES PATENTS

| | | | |
|---|---|---|---|
| 2,516,016 | 7/1950 | Pakala | 315—111 X |
| 2,887,562 | 5/1959 | Mencotti | 219—75 |
| 2,898,516 | 4/1959 | Volff | 219—131 X |
| 3,131,276 | 4/1964 | Watson | 315—111 X |
| 3,149,222 | 9/1964 | Giannini | 219—121 |
| 3,158,727 | 11/1964 | Woelz | 219—60 |
| 3,174,027 | 3/1965 | Manz | 219—131 |
| 3,183,293 | 5/1965 | Beasley | 219—121 |

JAMES W. LAWRENCE, *Primary Examiner.*

GEORGE WESTBY, *Examiner.*

S. D. SCHLOSSER, *Assistant Examiner.*